Patented Mar. 3, 1942

2,275,181

UNITED STATES PATENT OFFICE 2,275,181

PROCESS FOR HYDROGENATING HYDROCARBONS

Vladimir N. Ipatieff and Ben B. Corson, Chicago, Ill., assignors to Universal Oil Products Company, Chicago, Ill., a corporation of Delaware No Drawing. Application April 3, 1939, Serial No. 265,774

3 Claims. (Cl. 260—667)

This invention relates to a particular type of catalyst which has been found especially effective in the hydrogenation of normally liquid monoolefinic and aromatic hydrocarbons, although it may be employed also in other types of organic hydrogenation reactions.

It is recognized that the use of catalysts in hydrogenation reactions is an art of long standing and that many catalysts have been developed which are effective in promoting specific hydrogenating reactions involving only single chemical compounds, mixtures of unsaturated compounds, or related groups. In general, the most active catalysts for effecting hydrogenation reactions involving the direct non-destructive addition of hydrogen to hydrocarbons have been prepared by the reduction of nickel oxides, although in many well known instances the use of this particular type of active catalytic material is limited by the fact that it is especially sensitive to oxidation or sulfurization and, therefore, is limited in regard to active catalyst life. For this reason many attempts have been made to utilize more rugged catalysts of lower activity which are not as sensitive to the poisoning influences of oxygen, sulfur, and other interfering substances, and which may be reactivated readily by successive oxidation and reduction.

We have found that although pure copper is substantially without hydrogenating activity, additions thereto of certain metal oxides, which alone also have little hydrogenating activity, produce effective composite hydrogenation catalysts which not only do not undergo excessive poisoning but are reactivated readily.

In one specific embodiment the present invention comprises a composite catalytic material consisting of approximately 95–25% by weight of reduced copper and 5–75% by weight of a metal oxide selected from the group consisting of zinc oxide and iron oxide.

It is obvious that the composition of the catalyst, as given above, may be varied within reasonable limits without departing from the scope of the invention. However, when the manufacture of the preferred catalytic material is conducted properly it is generally found that the above analysis represents the composition of the finished material having the desired hydrogenating activity.

The hydrogenation catalyst forming the subject matter of the present invention may be prepared alternatively by several methods which result in the formation of granular or pelleted material of definite composition which has been found to be more or less critical when considering the factors of ease of manufacture, cost, original activity, catalyst life, and ease of its reactivation by oxidation and reduction.

One method of preparing the preferred catalyst consists in co-precipitating copper carbonate or copper hydroxide and a hydroxide of another metal by the addition of ammonium carbonate solution to a solution containing the desired proportions of the nitrates of copper and of the desired promoter metal. The resulting precipitate is washed with water to remove water soluble impurities, dried, formed into particles by pressing, pelleting, or other suitable methods, then calcined in a stream of air, nitrogen, or other inert gas, at a temperature in the approximate range of 350–450° C., followed by reduction in hydrogen at a temperature in the approximate order of 175–300° C. The production of a series of such catalysts containing different amounts of the components, as indicated in a later example, and their subsequent testing on the hydrogenation of benzene at 225° C., and under substantially atmospheric pressure, showed that the percentage of hydrogenation effected during a contact time of 180 seconds was dependent upon the composition of the catalyst being used.

As a result of a number of runs on catalytic materials consisting of metal oxides and reduced copper, we have found that catalytic materials of mild activity result from the use of such oxides as those of zinc and iron. As will be indicated in a subsequent example, the hydrogenating activity is dependent upon the composition of the catalyst. Approximately 75% by weight of the metal oxide is required to give a high degree of hydrogenating activity to the resultant composite. It is not to be inferred, however, that the addition of a given percentage of one or another promoter to copper produces finished catalysts of identical hydrogenation activity. Each promoter and each proportion thereof added to reduced copper exerts its own promoting influence. Usually the use of relatively lower or higher percentages of metal oxide than the optimum value results in the formation of catalysts with lower benzene hydrogenating activities.

Alternatively by a second method copper carbonate, hydroxide, or oxide, and a promoter hydroxide or hydrated oxide may be prepared separately, as by precipitation, admixed in the desired proportions, formed into particles and later treated successively by air or nitrogen and hydrogen to produce the desired reduced copper-metal oxide catalyst.

By a third method, a copper compound, as indicated above, may be admixed with the desired proportion of a promoter metal compound, then heated, ground, formed into particles and reduced; or especially in the preparation of catalysts containing relatively low concentrations of promoters, the powdered mixture of the dry components may be pelleted, then calcined and finally reduced by hydrogen.

A fourth method, which may be utilized, consists in forming mixtures of copper carbonate...

tures was prepared from solutions containing the required proportions of the nitrates of copper and the desired promoter metal. The hydrogenating abilities of catalysts so prepared were tested by passing a mixture of 6 volumes of hydrogen and 1 volume of pure benzene over each catalyst at 225° C. under atmospheric pressure and at different rates corresponding to chosen times of contact. The percentage of benzene and cyclohexane in the resulting product was then determined...

Certificate of Correction

Patent No. 2,275,181.  March 3, 1942.

VLADIMIR N. IPATIEFF ET AL.

It is hereby certified that error appears in the printed specification of the above numbered patent requiring correction as follows: Page 2, second column, lines 21 to 27 inclusive, Table I, for read

| Promoter | Hydrogenation of benzene | |
|---|---|---|
|  | ZnO | $Fe_2O_3$ |
| Weight per cent | Weight per cent | Weight per cent |

| Promoter Wt. % | Hydrogenation of benzene, Wt. % | |
|---|---|---|
|  | ZnO | $Fe_2O_3$ | and that the said Letters Patent should be read with this correction therein that the same may conform to the record of the case in the Patent Office.

Signed and sealed this 24th day of November, A. D. 1942.

[SEAL]

HENRY VAN ARSDALE,
*Acting Commissioner of Patents.*